Figure 7:
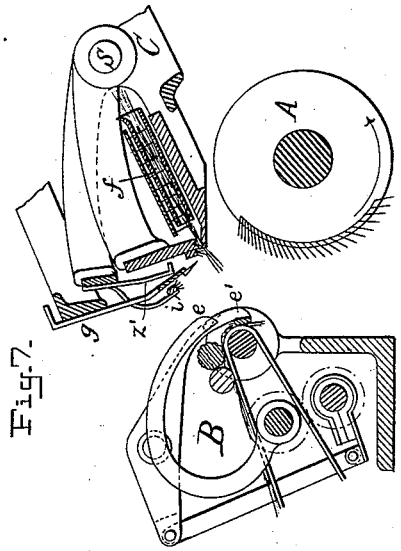
Figure 9:
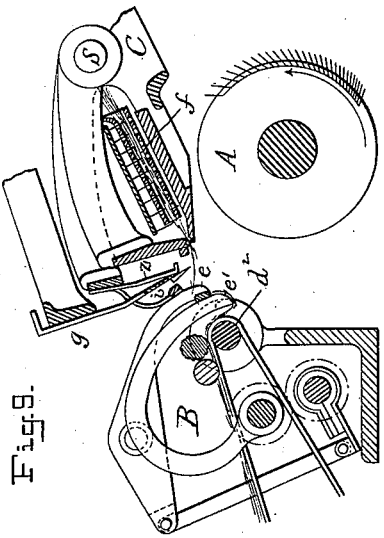

(No Model.) 10 Sheets—Sheet 1.
H. L. OFFERMANN & G. ZIEGLER.
The Land Title and Trust Company Administrator of G. Ziegler, Dec'd.
COMBING MACHINE.
No. 481,812. Patented Aug. 30, 1892.
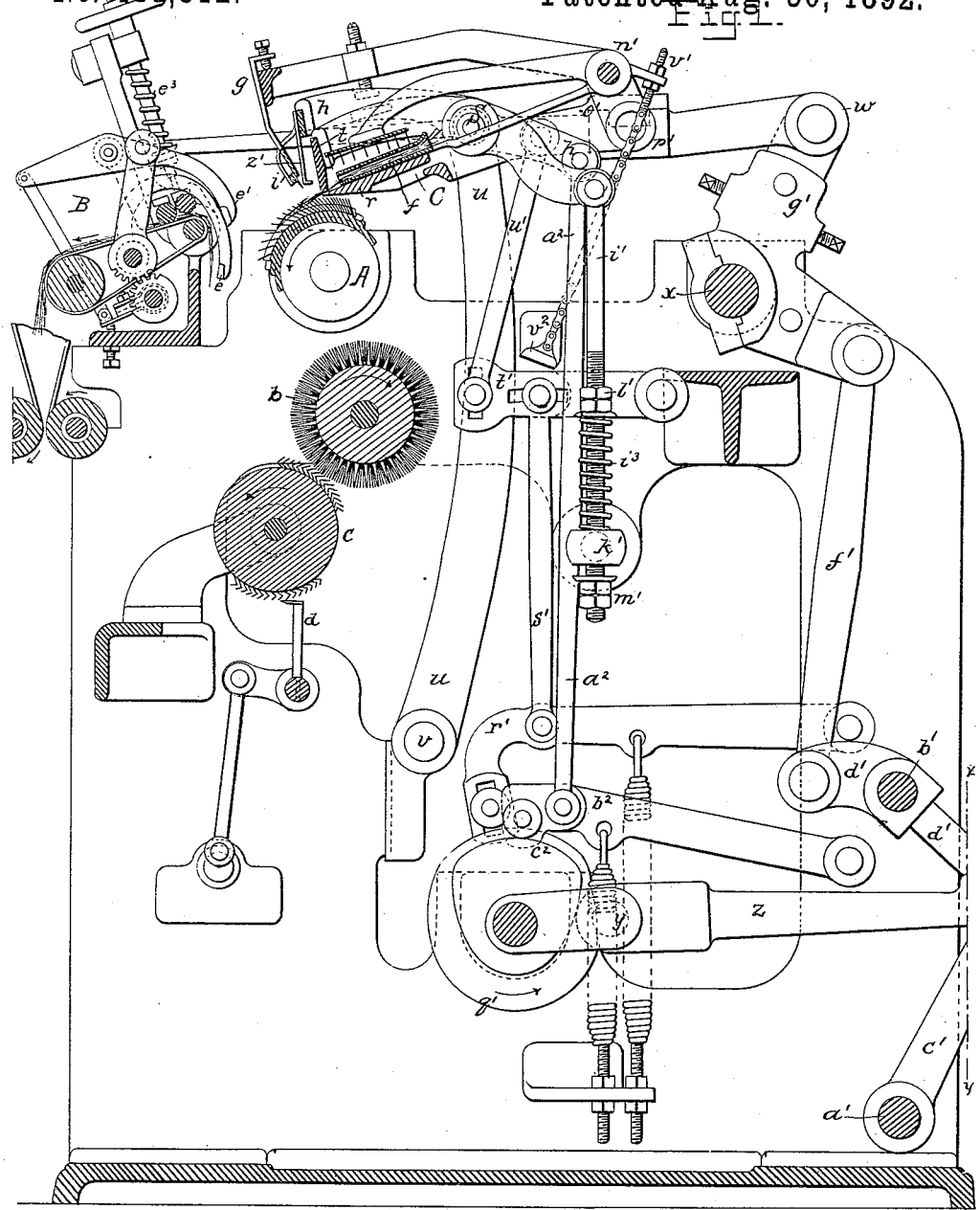
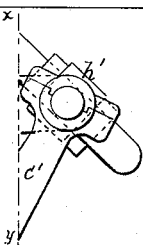
WITNESSES:
E. J. Griswold
George Baumann
INVENTORS:
Hubert Leopold Offermann
and Gaspard Ziegler
BY
Howson and Howson
ATTORNEYS

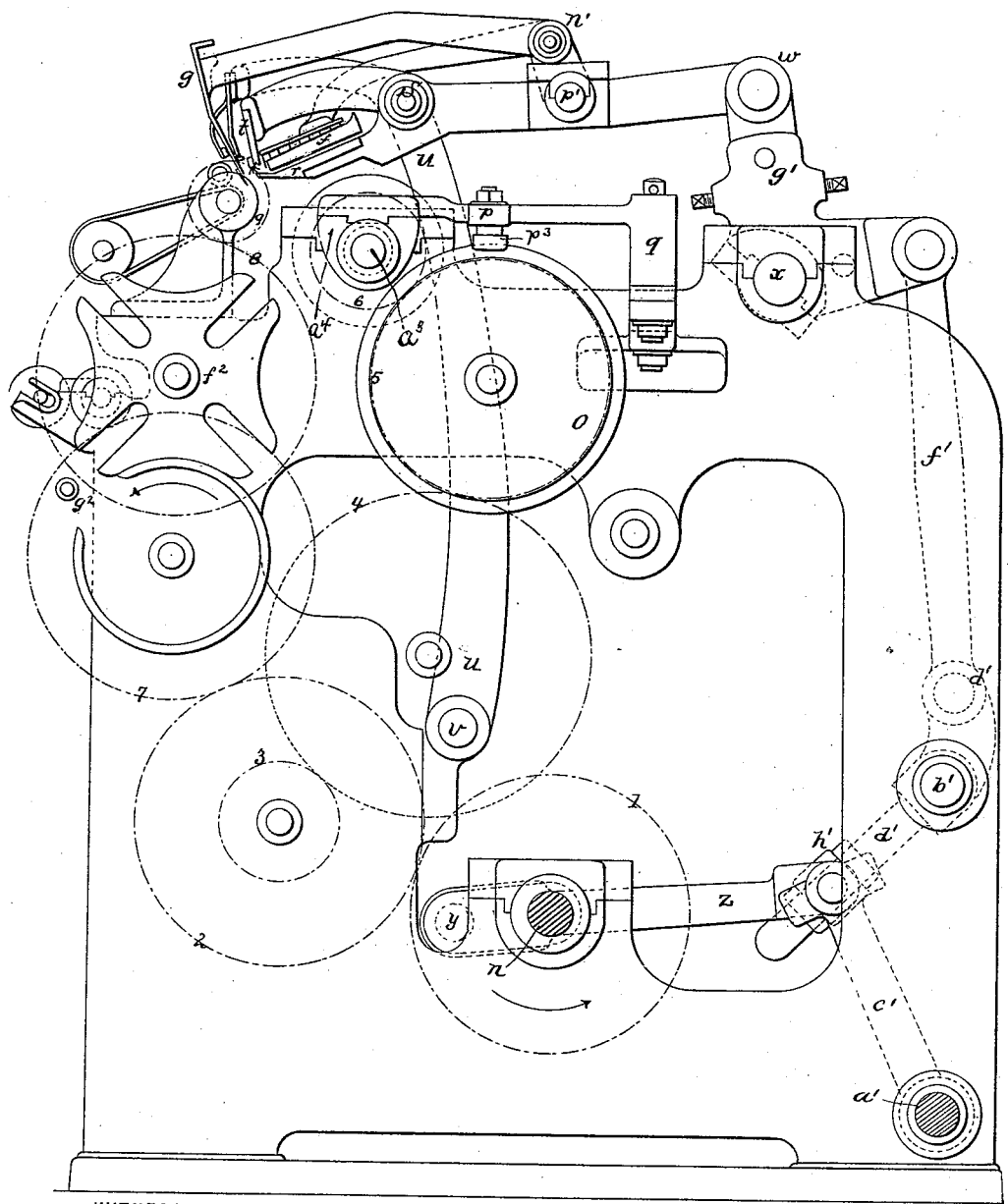

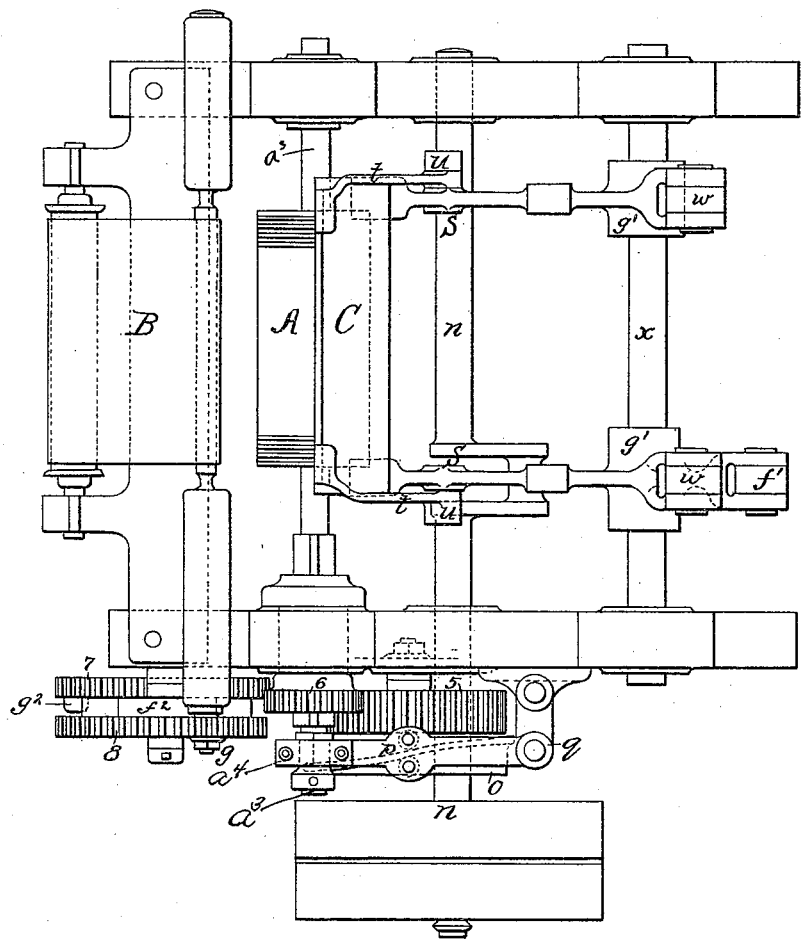

(No Model.) 10 Sheets—Sheet 4.
H. L. OFFERMANN & G. ZIEGLER.
THE LAND TITLE AND TRUST COMPANY Administrator of G. ZIEGLER, Dec'd.
COMBING MACHINE.
No. 481,812. Patented Aug. 30, 1892.
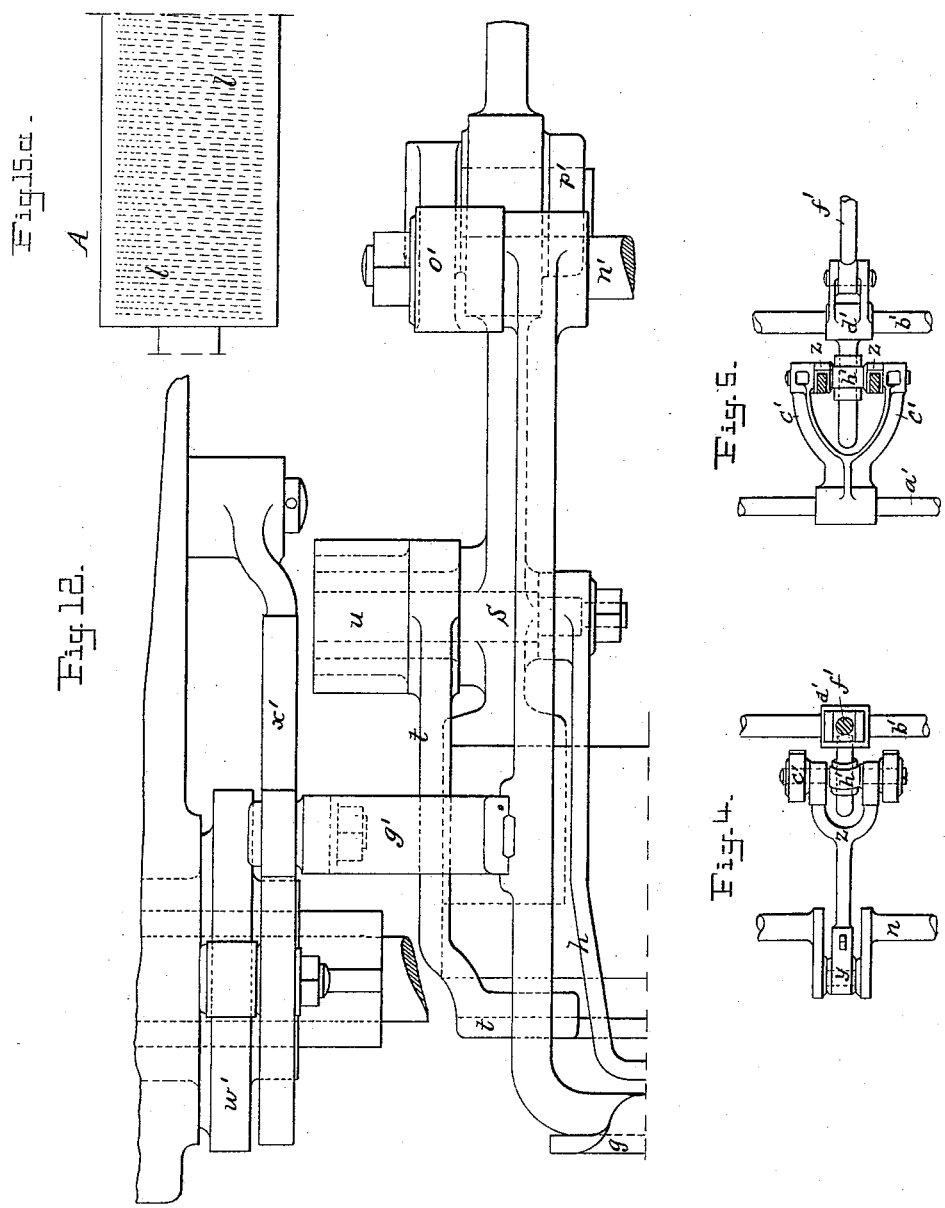
WITNESSES:
E. J. Griswold
George Baumann
INVENTORS
Hubert Leopold Offermann
BY and Gaspard Ziegler
Howson and Howson
their ATTORNEYS (No Model.) 10 Sheets—Sheet 5.

H. L. OFFERMANN & G. ZIEGLER.
The Land Title and Trust Company Administrator of G. Ziegler, Dec'd.
COMBING MACHINE.

No. 481,812. Patented Aug. 30, 1892.

WITNESSES:
E. J. Griswold.
George Baumann

INVENTORS
Hubert Leopold Offermann
and
Gaspard Ziegler
BY Howson and Howson
their ATTORNEYS (No Model.) 10 Sheets—Sheet 6.

H. L. OFFERMANN & G. ZIEGLER.
The Land Title and Trust Company Administrator of G. Ziegler, Dec'd.
COMBING MACHINE.

No. 481,812. Patented Aug. 30, 1892.

WITNESSES:
E. J. Griswold.
George Baumann

INVENTORS
Hubert Leopold Offermann
and Gaspard Ziegler
BY Howson and Howson
their ATTORNEYS (No Model.) 10 Sheets—Sheet 7.
H. L. OFFERMANN & G. ZIEGLER.
The Land Title and Trust Company Administrator of G. Ziegler, Dec'd.
COMBING MACHINE.
No. 481,812. Patented Aug. 30, 1892.
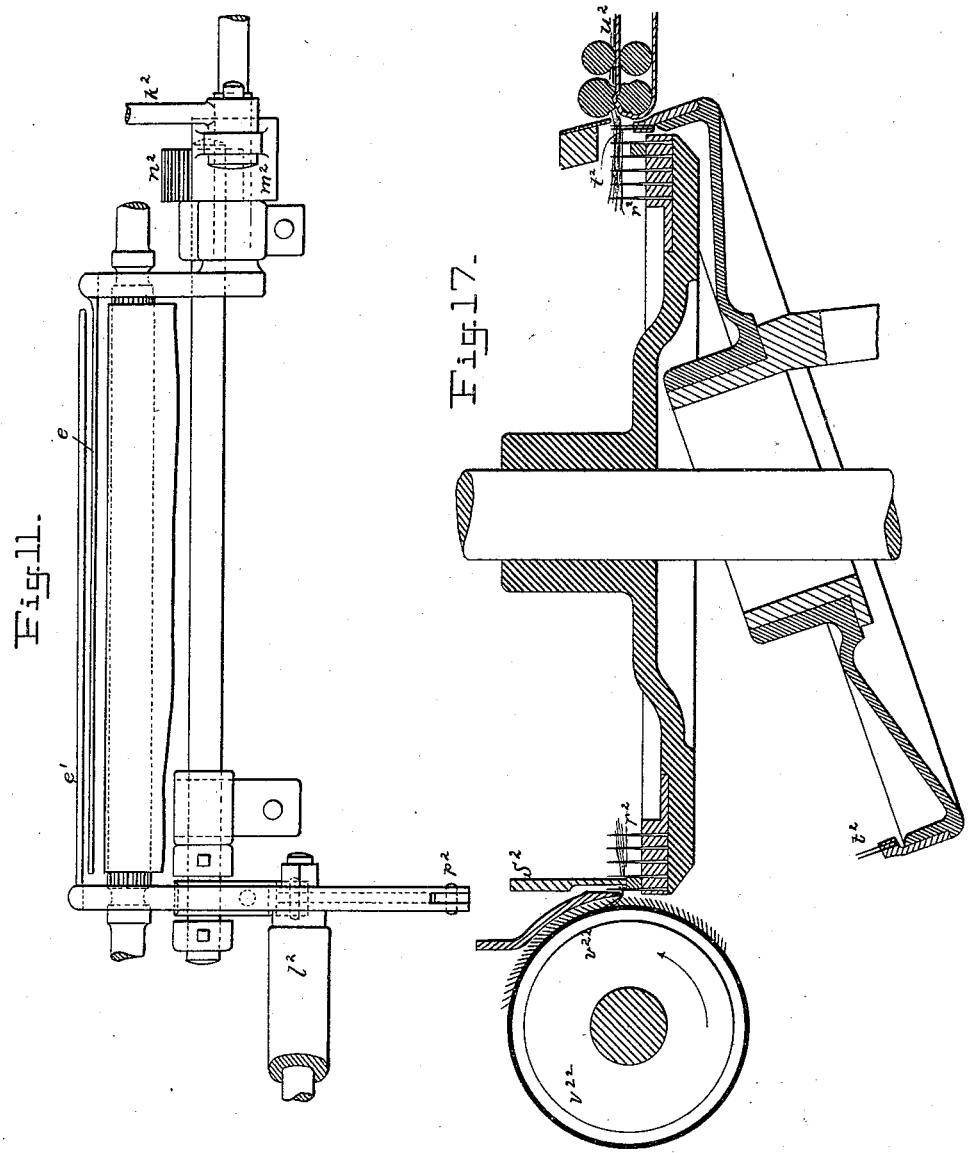
WITNESSES:
E. J. Griswold
George Baumann
INVENTORS
Hubert Leopold Offermann
and Gaspard Ziegler
BY Howson and Howson
their ATTORNEYS (No Model.) 10 Sheets—Sheet 8.

H. L. OFFERMANN & G. ZIEGLER.
The Land Title and Trust Company Administrator of G. Ziegler, Dec'd.
COMBING MACHINE.

No. 481,812. Patented Aug. 30, 1892.

WITNESSES:
E. J. Griswold
George Baumann

INVENTORS
Hubert Leopold Offermann
and
BY Gaspard Ziegler
Howson and Howson
their ATTORNEYS (No Model.) 10 Sheets—Sheet 9.
H. L. OFFERMANN & G. ZIEGLER.
The Land Title and Trust Company Administrator of G. Ziegler, Dec'd.
COMBING MACHINE.
No. 481,812. Patented Aug. 30, 1892.
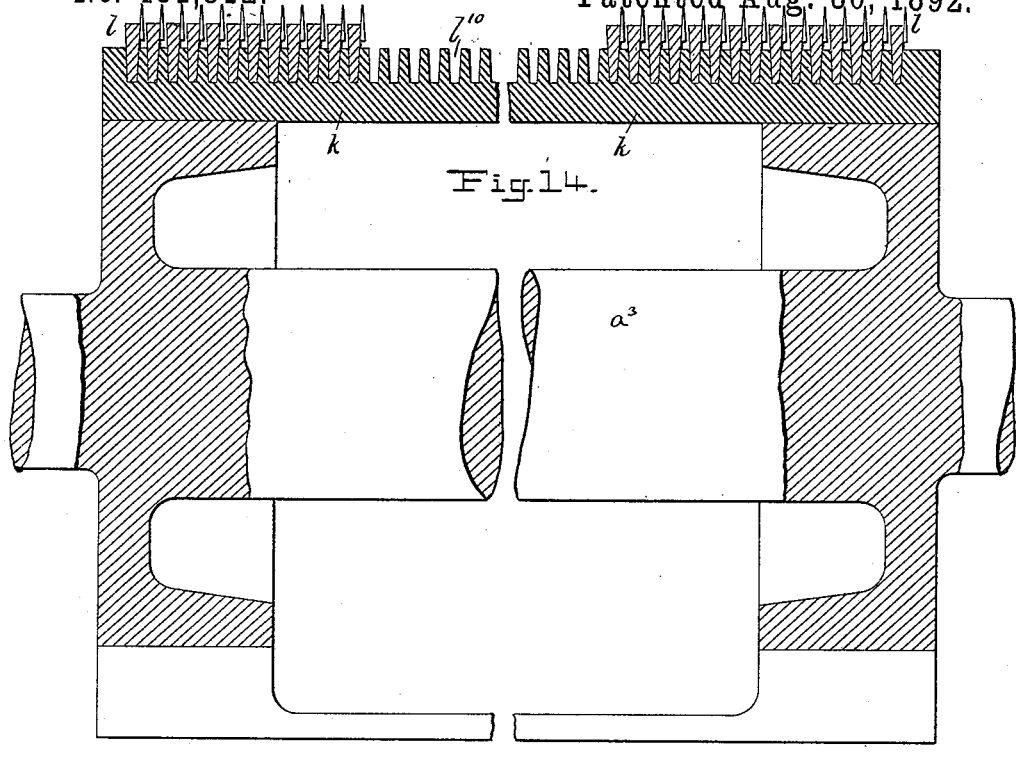
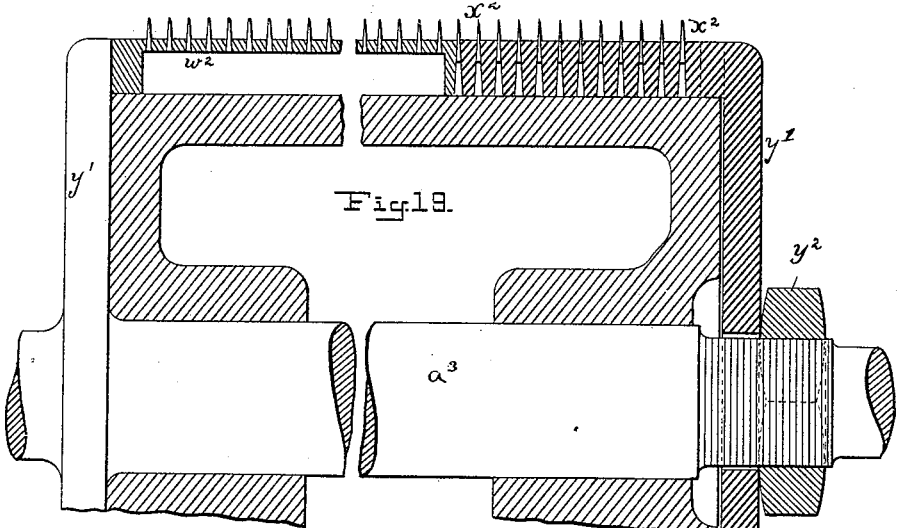
WITNESSES: INVENTORS
E. J. Griswold Hubert Leopold Offermann,
George Baumann and Gaspard Ziegler,
BY Howson and Howson
ATTORNEYS (No Model.) 10 Sheets—Sheet 10.
H. L. OFFERMANN & G. ZIEGLER.
The Land Title and Trust Company Administrator of G. Ziegler, Dec'd.
COMBING MACHINE.
No. 481,812. Patented Aug. 30, 1892.
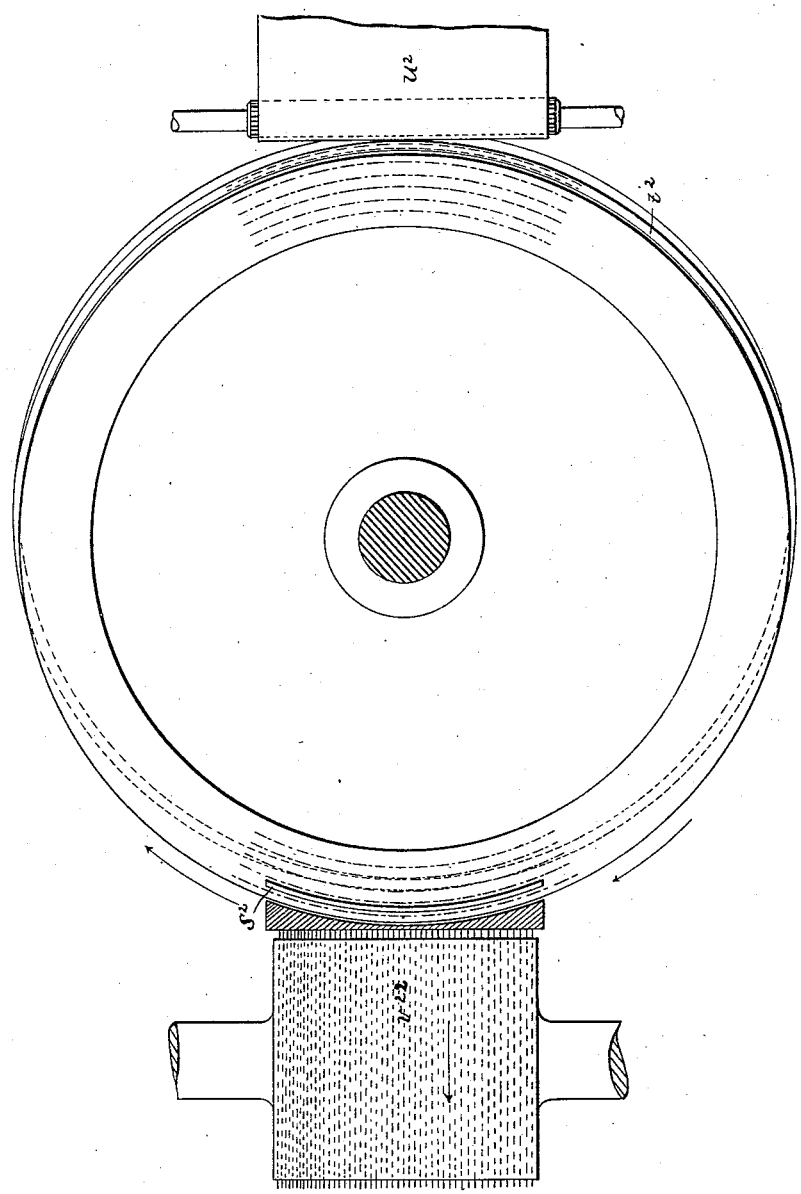
WITNESSES:
E. J. Griswold
George Baumann
INVENTORS
Hubert Leopold Offermann
and Gaspard Ziegler,
BY
Howson and Howson
their ATTORNEYS

United States Patent Office.

HUBERT LEOPOLD OFFERMANN, OF LEIPSIC, AND GASPARD ZIEGLER, OF MULHOUSE, GERMANY; THE LAND TITLE AND TRUST COMPANY ADMINISTRATOR OF GASPARD ZIEGLER, DECEASED.

COMBING-MACHINE.

SPECIFICATION forming part of Letters Patent No. 481,812, dated August 30, 1892.

Application filed August 1, 1888. Serial No. 281,611. (No model.) Patented in France May 29, 1888, No. 190,868; in Belgium June 1, 1888, No. 82,004; in England June 14, 1888, No. 8,714; in Germany June 17, 1888, Nos. 51,583 and 52,333; in Italy June 28, 1888, No. 23,713; in Switzerland March 15, 1889, No. 601, and in Russia June 30, 1890, No. 6,685.

*To all whom it may concern:*

Be it known that we, HUBERT LEOPOLD OFFERMANN, director of the Leipsic Wool Combing Company, of Leipsic, and GASPARD ZIEGLER, manufacturer, of Mulhouse, in the Empire of Germany, have invented certain new and useful Improvements in Combing-Machines, (for which we have obtained Letters Patent in France No. 190,868, dated May 29, 1888; in Belgium, No. 82,004, dated June 1, 1888; in Great Britain, No. 8,714, dated June 14, 1888, in Italy, No. 23,713, dated June 28, 1888; in Switzerland, No. 601, dated March 15, 1889; in Russia, No. 6,685, dated June 30, 1890; and in Germany, Nos. 51,583 and 52,333 dated June 17, 1888,) of which the following is a specification.

The invention relates to improvements in that class of combing-machines in which the drawing-rollers alternately advance toward and retreat from the finishing-comb and nippers in order to effect the drawing forward of the sliver.

This improvements which form the subject of the present application consist, mainly, first, in so arranging the parts that the reciprocating movements of the drawing-rollers are dispensed with and the rollers occupy a constant fixed position, but the finishing-comb, the nippers, and the feed mechanism alternately approach toward and recede from the drawing-rollers; second, in certain improvements and structural alterations in the comb-cylinder, as hereinafter fully set forth. These two new features have the advantage of increasing materially the production of the machine for the following reasons: first, because the drawing-rollers are by our improvement driven directly from the main shaft of the machine and thus have greater drawing power, and, second, because the comb-cylinder constructed according to our improvements, as hereinafter described, is capable of operating upon a much thicker lap or band of sliver than an ordinary comb-cylinder. Besides these advantages we have the following, that the movements being effected principally by a combination of rods and levers, the machine may be run at a higher speed and yet very smoothly.

In order that this invention may be fully understood and readily carried into effect, we will describe the accompanying sheets of drawings, reference being had to the figures and letters marked thereon.

Figure 1 is a vertical section of a combing-machine embodying our improvements, parts being in elevation. Fig. 2 is a side view, and Fig. 3 is a plan, of the same, the plan being on a smaller scale than Figs. 1 and 2. Figs. 4 to 16 are views in detail of parts of the machine. Figs. 17, 18, and 19 are detail views of a modification.

Similar letters and figures refer to similar parts throughout the several views.

In Figs. 1 to 3, A represents the comb-cylinder, which is cleared of waste in the usual way by means of the rotary brush $b$, the card-cylinder $c$, and comb $d$.

B represents the drawing apparatus. $d^2 e^2$ are the drawing-rollers, of which the lower roller $d^2$ is journaled in fixed bearings and is geared to the main shaft $n$, so that both rollers receive an intermittent rotary motion, as subsequently described. The drawing operation commenced by the rollers $d^2 e^2$ is completed by the faller-arm $e$, which is arranged and actuated according to the system described by Dujardin in French patent of November 14, 1877, No. 121,020. C represents the nipper, $f$ the usual feed mechanism, and $g$ the finishing-comb. The nipper C has a combined movement, whereby it presents the end of the sliver alternately to the comb-cylinder A and to the drawing apparatus B, which on their parts both remain constantly in the same positions. This movement of the nipper is so arranged that it remains sufficiently long near the comb-cylinder A and the drawing apparatus B to accomplish the two operations of combing and drawing in the most effective manner.

The working of the machine may be divided into four distinct periods.

Figure 6:
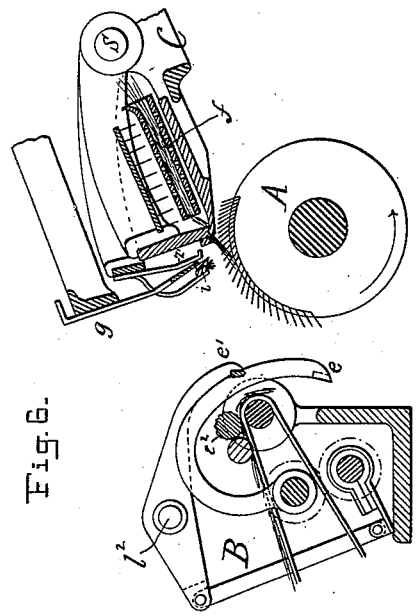
Figure 8:
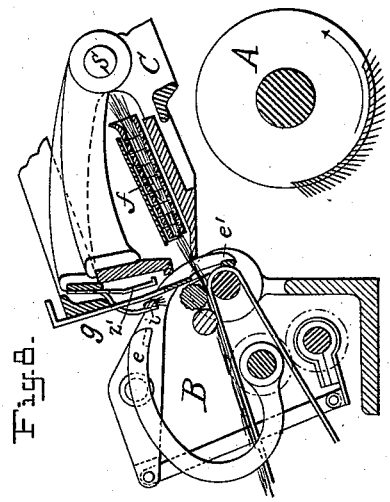

The first period is when the parts are in the relative positions shown in Figs. 1 and 6, with the jaws of the nipper C closed and standing above the comb-cylinder A. At this moment the combing of the front end of the sliver takes place by the comb-cylinder, the faller-arm $e$ occupying its lowest position and pressing on the tail of the sliver previously drawn in such a manner as to cause all the fibers to rest on the lower drawing-roller $d^2$.

The second period (illustrated by Fig. 7) is that during which the nipper advances toward the drawing apparatus. At the beginning of this period the feed mechanism and the finishing-comb $g$ recede from the comb-cylinder. The jaws of the nipper then open and the nipper approaches the drawing apparatus B, leaving sufficient room between the latter and the finishing-comb $g$ for the feed to take place during the drawing process.

The third period (illustrated by Fig. 8) is that during which the nipper stops and the faller-arm $e$ is raised to its highest position, as shown. The drawing-rollers $d^2$ $e^2$ begin to turn just before the stoppage of the nipper with the object of seizing the first fibers of the end of the sliver during its movement toward the drawing-rollers. After the end of the sliver has been seized by the rollers $d^2$ $e^2$ the finishing-comb $g$, as well as the feed-gills, are depressed and then advance toward the drawing-rollers, while the nipper remains at rest in such a manner that the feed and drawing take place simultaneously.

The fourth period (illustrated by Fig. 9) is that during which the nipper recedes from the drawing-rollers and the faller-arm $e$ is lowered to effect the drawing or separating of the end of the sliver before the jaws of the nipper are closed. After the nipper is shut the finishing-comb $g$ rises, and at the same time the brush $i$, oscillating about the center $s$, Fig. 10$^a$, passes close enough to the comb $g$ to clean it. The brush $i$, continuing its downward course as far as the comb-cylinder A, is itself cleaned by the latter.

The foregoing description gives a general outline of the working of the machine. We now describe in detail the various parts.

*The comb-cylinder.*—In combing-machines on Heilmann's system the comb-segment hitherto employed has been composed of several rows of teeth arranged parallel with the axis of the cylinder on which they were fixed. The attempt which has been made to use comb-segments with teeth of progressively-increasing fineness has not been successful, first, because the teeth are not strong enough thoroughly to penetrate the sliver; secondly, because the teeth cannot be placed sufficiently close together to comb properly, and, finally, because of the difficulty of removing the waste from them. Heilmann's segment only combs properly when the last rows of teeth traversing the sliver are very fine and when the nipper is so adjusted as to be very close to the points of the teeth in these rows; but this manner of working has the disadvantage of straining the fibers very much and destroying the natural texture of the more delicate and weaker fibers, because the teeth of each row, owing to the abrupt stoppage of the nipper, penetrate simultaneously into the whole thickness of the sliver-band, thereby causing a strain on the fibers exceeding their limit of elasticity.

The improved comb-segment of our machine is based on the principle of arranging the teeth not one beside the other, but one behind the other. In Heilmann's comb-segment each row contains the same number of teeth, the rows are arranged parallel to the axis, and the teeth become finer and finer in proportion to their passage into the sliver, while in our case the rows of teeth form segments of circles, the planes of which are at right angles to the axis and each of which contains teeth of varying degrees of fineness necessary to insure proper combing, and in order that every fiber in the sliver-band may be combed by every size of tooth composing each segment the combing-cylinder is given an alternating transverse motion.

Figure 13:
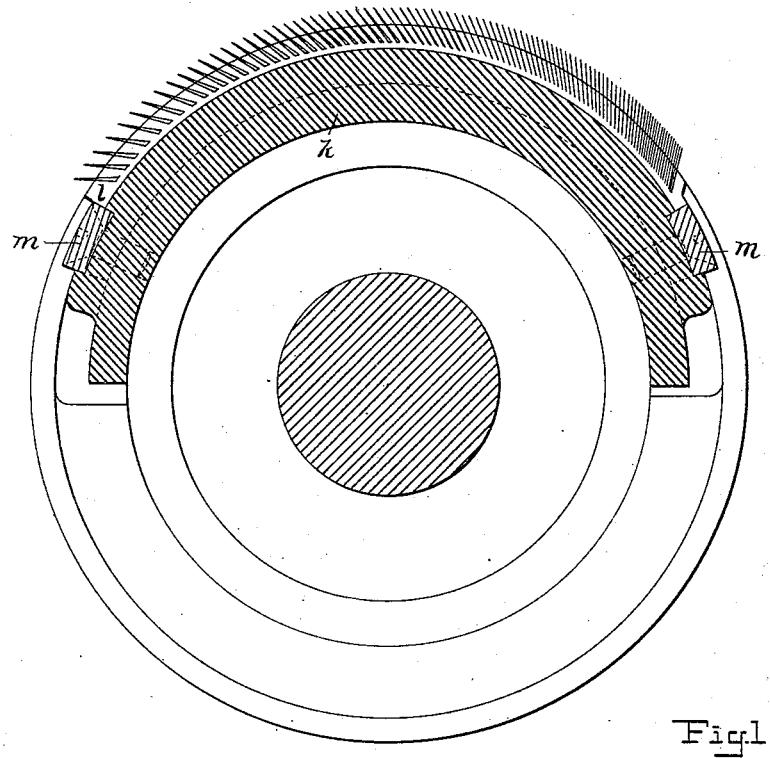

Figs. 13 and 14 represent a comb-cylinder constructed according to our invention with the improved comb-segment $k$. This segment is composed of a series of toothed plates $l$, one of which is shown detached in Figs. 15 and 16, which are arranged in grooves $l^{10}$ in the segmental plate $k$ at right angles to the axis and which are distant from three to four millimeters from each other, the toothed segmental plates $l$ being secured in position by cross-plates $m$, screwed to the segments $k$.

Figure 15:
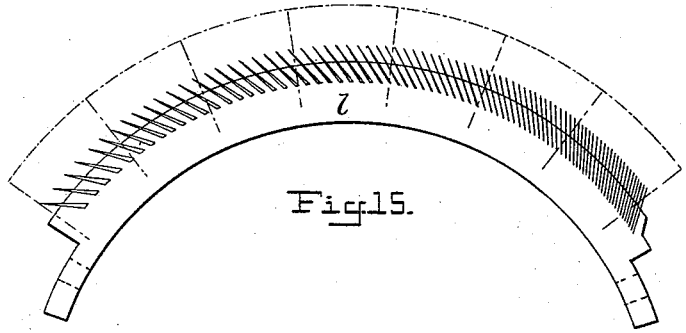
Figure 16:

The toothed segmental plate $l$ is formed, as best shown in Fig. 15, of seven groups of teeth of progressive fineness. The teeth may all be soldered to the plate, or the coarser teeth cast on and the finer teeth only soldered on. The alternating transverse motion above mentioned of the comb-cylinder should be in proportion to the length of each group of teeth and to the distance between the various toothed segmental plates. Thus if the toothed segmental plates are placed four millimeters distant from each other, as shown in the drawings, and each group of teeth is twenty millimeters long in circumference, the comb-cylinder should have four millimeters of transverse motion for every twenty millimeters of rotary motion. In the present case, therefore, a total transverse motion of four by seven equal twenty-eight millimeters, in order that the whole of the sliver may be uniformly traversed by all the groups of teeth.

As shown in Figs. 2 and 3, the comb-cylinder A receives its rotary as well as its transverse motion from the main shaft $n$. The rotary motion is transmitted through the wheels 1, 2, 3, 4, 5, and 6, the wheel 6 being on the same shaft with the cylinder A, and the transverse motion through the cam $o$, attached to the boss of the wheel 5. This cam $o$, which is shown as a flanged cam acting on pins or rollers $p^3$ on the lever $p$, gives an oscillating movement to the lever $p$ which is fulcrumed at one end on the stud $q$, and at the other end is connected to and moves the shaft of the revolving comb-cylinder endwise in its bearings.

In the drawings, Figs. 2 and 3, the connection between the lever $p$ and the shaft $a^3$ of the cylinder A is shown as made by securing to the end of the lever $p$ a block $a^4$, which embraces a sleeve on the shaft $a^3$. This sleeve, fastened to the shaft, is free to turn in the block $a^4$, but moves longitudinally with it.

As the teeth on the segment no longer pass in rows but one behind the other, the application of the improved segment offers various advantages, as follows: The strain produced in the sliver by the passage of the teeth arranged, as described, causes less strain on the nipper, and the sliver acted on by the teeth may be much thicker without damaging the fibers, and this has the effect of considerably augmenting the production of the machine and of producing a cleaner and better sliver. The cleaning of the comb-teeth by the circular brush $b$ has also an advantage over Heilmann's arrangement, as with the latter the brush scatters and throws to a distance a large quantity of fibers which should be collected with the waste, while with our improved comb-segment the brush penetrates into the free spaces between the rows of teeth without scattering, so as to cause only the heavy impurities to fall in the form of dust while the fibers are deposited on the card-cylinder $c$ and removed in the form of waste or noils by the doffer-comb $d$.

Figure 10:
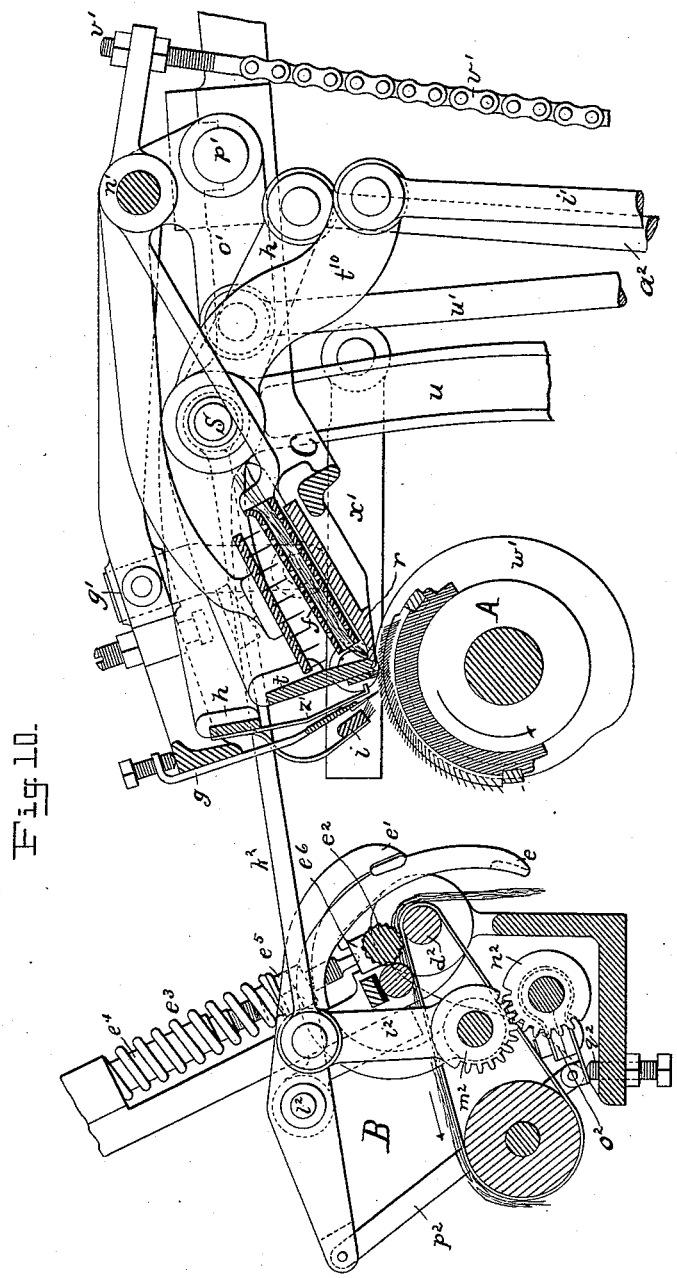

The nipper consists, Figs. 1, 2, and 10, of the lower jaw $r$ and the upper jaw $t$, both oscillating about the stud S. The stud S is carried on an arm $u$, which oscillates about a fixed stud $v$. The nipper has a second point of attachment in the stud $w$, which rocks with the bell-crank lever $g'$ about the shaft $x$, secured to the frame of the machine. The bell-crank lever $g'$ is connected by a rod $f'$ to one end of a lever $d'$, which is fulcrumed at $b'$. On the lower portion of the lever $d'$ is fitted a sliding boss $h'$, Figs. 2, 4, and 5, which is actuated and guided by a rod $z$, connected to a crank $y$ on the shaft $n$, and by a lever $c'$, which turns about the shaft $a'$. The boss $h'$ is consequently the part upon which the rod $z$ acts, the boss being moved toward or away from the center of oscillation $b'$ by the arm $c'$, according to the position of the crank $y$ on the shaft $n$. It is therefore not merely the simple motion of the crank which is transmitted to the nipper but a combined movement, which has the effect of accelerating the movement of the nipper at the middle of its course and retarding it at the extreme points. This retardation is also influenced by the position of the piece $d'$, as shown in Fig. 2, which represents the moment in the process of drawing when the nipper should be nearly stationary. The piece $d'$ is, relatively to the rod $f'$, at the dead-point, so that at this instant the influence of the motion of the crank $y$ is reduced to a minimum. In the opposite position, as shown in Fig. 1, this stoppage is not necessary. The nipper may have a slight amount of play near its line of contact with the comb-cylinder, which is actually the case, since in that position of the nipper the lever $d'$ acts on the rod $f'$ when at right angles to it.

The above arrangement in relation to the movement of the crank has the effect of causing the nipper to remain near the comb-cylinder A and the drawing apparatus as long as is necessary, and of starting and stopping the oscillating of the nipper very gradually while accelerating it considerably in the middle of its course to avoid all loss of time. This arrangement of the mechanism greatly facilitates an increase of the speed of the machine, and consequently augments the number of drawings in a given time, which results could not be obtained were these motions of the nippers to be effected by means of eccentrics.

The opening and closing of the jaws of the nipper is effected by means of the rod $i'$, (see Figs. 1 and 10,) which is pivoted at one end to the lever $t^{10}$, forming the back part of the upper jaw $t$, while the other end passes freely through a bore formed in a piece $k'$, which is provided with a stud turning freely in the framing, the axis of the said bore being at right angles to the axis of rotation of the piece $k'$. A spiral spring $i^3$, compressed between the piece $k'$ and the nut $l'$, constantly presses the upper jaw $t$ downward and, as in the position shown in Fig. 1, there is some play between the piece $k'$ and the nuts $m'$ the nipper is subjected at this moment to the whole pressure exerted by the spring. When the nipper moves toward the drawing-rollers $d^2 e^2$, it takes with it the rod $i'$ until the nut $m'$ touches the piece $k'$, which causes the rod to pull on the upper jaw $t$ and open the nipper. The continued forward movement of the nipper raises the upper jaw farther and farther; but when the nipper recedes from the drawing-roller the upper jaw again approaches the lower jaw $r$ until the nipper is closed, the nut $m'$ moving away from the piece $k'$ and the spring $i^3$ again pressing with its full force one jaw against the other.

The arrangement of the feed apparatus and of the finishing or vibrating comb $g$ does not differ appreciably from known principles of construction, and it only remains to describe their mechanism.

The parts above referred to oscillate about the axis $n'$, (see Figs. 1, 2, 10, and 12,) which by means of the bell-crank lever $o'$ in its turn oscillates about the axis $p'$. The cam $q'$, Fig. 1, fixed on the main shaft $n$, causes by means of the rocking-levers $r'$ and $t'$ and of the connecting-rods $s'$ and $u'$ the oscillation of the bell-crank lever $o'$, and consequently the reciprocating motion of the feed apparatus and the comb $g$.

The rising-and-falling motion of the feed-gills is accomplished by the chain $v'$, (see Figs. 1 and 10,) which at the top end is attached to a lug on the arm carrying the gills and at the lower end to a bracket $v^2$ on the framing. This movement is produced in a similar way to that of the upper jaw $t$ of the nipper, and the vibrating motion of the comb $g$ is effected by the cam $W'$, (see Figs. 10 and 12,) which is attached to the shaft of the comb-cylinder A. This cam $w'$ causes a pivoted lever $x'$ to rock on which rests the arm $g'$ in connection with the lever of the comb $g$, so that the comb $g$ has an independent rising-and-falling movement imparted to it in addition to the advancing and retiring motion with the nipper.

The brush $i$, Figs. 1 and 10, which cleans the comb $g$, and the angle-plate $z'$, which assists the cleaning action and which might be replaced by a brush, both rock about the stud S by means of the double lever $h$, on which they are supported, and are operated through the rod $a^2$ and the rocking lever $b^2$ from the cam $C^2$, keyed on the main shaft $n$.

The drawing apparatus, Fig. 10, consists, chiefly, of the plain roller $d^2$ and the fluted roller $e^2$. A rod $e^4$, provided with a nut $e^5$ and spring $e^3$, presses against the bearings $e^6$ of the roller $e^2$ and tends to hold the said roller against the roller $d^2$. The intermittent rotary motion of this pair of rollers is transmitted to them from the main shaft $n$ through the wheels 1, 2, 7, 8, and 9, Fig. 2, of which the last named is fixed on the lower roller $d^2$. On the boss of the wheel 8 is fixed the star-wheel $f^2$, Fig. 2, which is caused to make a quarter-turn by the roller $g^2$ at each revolution of the wheel 7 on the side of which the roller is mounted.

As one complete cycle of the machine comprising the four periods hereinbefore described corresponds to one revolution of the main shaft $n$, and as the wheels 1, 7, and 8 have the same number of teeth the period of this quarter-turn of the star-wheel corresponds with the third period during which, as previously explained, the nipper remains near the drawing apparatus and the drawing takes place. As the drawing and feed take place at the same time and the rotary motion of the rollers ceases immediately, the feed stops, so as to commence the next drawing at the point where the preceding one left off, all the conditions necessary for forming an even sliver are fulfilled. While the nipper recedes from the drawing-rollers the drawing is completed by the faller-arm $e$, which vibrates about the axis $m^2$, Figs. 10 and 11, and which is operated from the nipper by means of the lever $i^2$ and the rod $k^2$.

In order that during the upward movement of the faller-arm $e$ the free end of the sliver may not be carried away by the former, a counter-faller $e'$, oscillating about the stud $l^2$, serves to retain the end in place. The counter-faller $e'$ is actuated from the faller $e$ by means of wheel-segments $m^3$ and $n^2$, the brake or friction-clip $o^2$ acting on the segment $n^2$ and the rod $p^2$. The motion of the counter-faller $e'$ is limited on the one hand by the adjusting-screw $q^2$, against which presses the arm of the brake, and on the other hand by the lower roller $d^2$, with which the counter-faller itself comes in contact, Figs. 8 and 10. From this arrangement it follows that the faller $e$ during its forward and downward course always commences by directing the counter-faller toward the stop $q^2$ in order to make room for itself. During the descending movement the faller $e$ passes between the drawing-rollers and the counter-faller $e'$ and completes the drawing while making the end of the sliver pass above the latter, Fig. 9. The faller $e$ in rising commences by pushing the counter-faller $e'$ toward the roller, and in this way places it between itself and the end of the sliver, thus protecting the latter. This arrangement allows very long fibers to be combed on this machine even with a slight movement of the nipper. As the arcs of the circles described by the fallers $e$ $e'$ intersect each other each faller is supported only by a single lever or arm, the arm for the faller $e$ being at one side of the machine and that for the counter-faller $e'$ at the other side of the machine.

The principle on which the construction of the improved comb-segment, previously described, is based is equally applicable to comb-cylinders furnished with teeth over their whole surface and intended either for combing-machines on Heilmann's system or for circular combing-machines. Textile materials having fibers of medium fineness may be advantageously combed by cylinders furnished with teeth on their whole surface and having teeth of the same size or number. In this case greater or less velocity may be given to the comb-cylinder independently of the working of the machine combining this rotary motion with a slight transverse movement.

The lateral motion of the comb-cylinder may be dispensed with by arranging the rows of teeth helically, as shown in Fig. 15$^a$, giving them a very slight pitch or inclination in such a way that in the short length of sliver they do not differ much from parallel rows in not offering much resistance to the entrance of the circular brush for cleaning the teeth.

The application of the comb-cylinder to circular combing-machines is illustrated by Figs. 17 and 18, in which $r^2$ represents the circular comb, $s^2$ the nipper, $t^2$ the finishing-comb, $u^2$ the drawing-rollers, and $v^{22}$ the comb-cylinder.

The circular rows of teeth on the side of the cylinder at which the sliver enters are composed of wires of coarse numbers, the fineness of the teeth increasing successively toward the opposite side, as indicated in Fig. 18. When the material to be combed requires the employment of such fine teeth that they cannot be cast in but must be soldered, then the comb-cylinder $v^{22}$ on the side at which the sliver leaves ought to be made, as illustrated by Fig. 19, with circular rows of teeth similar in construction to the segmental plates of teeth, Figs. 15 and 16. In Fig. 19, $w^2$ is the portion of the comb-cylinder which is made with teeth cast in, while the portion $x^2$ is constructed with circles of teeth similar in character to the segments of teeth shown in Fig. 14, and fitted on the body of the cylinder and held in position by means of the nut $y^2$ and end plates $y'$.

The alternating transverse motion described is in the case of circular combing-machines replaced by the rotary motion of the circular combs. Here also the circular rows of teeth may be replaced by a single helical row passing round the cylinder as many times as there would be circular rows and composed of teeth becoming gradually finer from one end to the other.

As in certain circular combing-machines there are already comb-cylinders, the rows of teeth of which are not placed parallel with the axis but helically in such a manner that each row forms part of a very elongated helix—that is to say, a helix of which the thread has an inclination of more than forty-five degrees to a plane at right angles to the axis—it is necessary to point out that these cylinders differ nevertheless entirely from our improved comb-cylinders, as above described, because with a helix having an inclination of more than forty-five degrees, as aforesaid, the comb-cylinder must be classed in the category of those comb cylinders or segments in which the teeth are placed side by side, while, if the thread of the helix has an inclination of less than forty-five degrees, as in our case, the comb-cylinders have the properties of those in which the teeth are placed one behind the other. The difference between these two systems is also apparent in the different ways in which the cleaning-brush behaves. The brush penetrates to the bottom of the comb, having rows of teeth parallel to the axis, or teeth arranged in a long helix; but this penetration of the brush does not take place, however, when the teeth are placed one after the other in a less elongated helix and the card cannot be cleaned by the brush.

We claim as our invention—

1. In combing-machines, a comb-cylinder rovided with circular rows of teeth of inreasing fineness, substantially as set forth.

2. In a combing-machine, a comb-cylinder having circular rows of teeth of increasing fineness in planes at a slight inclination to planes which are at right angles to the axis of the cylinder, substantially as and for the purposes set forth.

3. In a combing-machine, the combination of the finishing-comb with a cleaning device therefor, consisting of a brush and an angle-plate, and mechanism to reciprocate the brush and plate against the comb, substantially as set forth.

4. In the drawing mechanism of a combing-machine, the combination of an oscillating faller-arm with a counter-faller and mechanism whereby the counter-faller is actuated by the movement of the faller-arm, in the manner and for the purpose set forth.

5. In a combing-machine, the combination of a nipper, a feed mechanism and a finishing-comb having a combined reciprocating motion, with mechanism consisting of a crank in the main driving-shaft and a system of levers, connecting-rods, and bell-cranks whereby the speed of the reciprocating motion diminishes at each end of the stroke, substantially as and for the purposes set forth.

6. In a combing-machine, the combination of a stationary drawing apparatus having drawing-rollers, a faller-arm and a counter-faller, a combing-cylinder and stationary bearings therefor, and a nipper, a finishing-comb, a device for cleaning the finishing-comb, and feed mechanism having a combined reciprocating motion, and mechanism for independently reciprocating the cleaning device, the comb, the feed mechanism, and one of the jaws of the nipper, substantially as set forth.

In testimony whereof we have signed our names to this specification in the presence of two subscribing witnesses.

HUBERT LEOPOLD OFFERMANN.
GASPARD ZIEGLER.

Witnesses for H. L. Offermann:
ERNST LENOLY,
CARL BORNGRAEBER.

Witnesses for G. Ziegler:
GEORGE GIFFORD,
JULES GUTHFILE.